(12) United States Patent
Bajzik

(10) Patent No.: US 12,335,127 B2
(45) Date of Patent: Jun. 17, 2025

(54) DATA ANALYTICS ON MEASUREMENT DATA

(71) Applicant: Nokia Solutions and Networks Oy, Espoo (FI)

(72) Inventor: Lajos Bajzik, Budapest (HU)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/483,213

(22) Filed: Oct. 9, 2023

(65) Prior Publication Data

US 2024/0163195 A1 May 16, 2024

(30) Foreign Application Priority Data

Nov. 10, 2022 (EP) .................................... 22206704

(51) Int. Cl.
| | |
|---|---|
| *G06F 15/16* | (2006.01) |
| *H04L 43/067* | (2022.01) |
| *H04L 43/106* | (2022.01) |
| *H04L 43/16* | (2022.01) |

(52) U.S. Cl.
CPC .......... *H04L 43/106* (2013.01); *H04L 43/067* (2013.01); *H04L 43/16* (2013.01)

(58) Field of Classification Search
CPC ...... H04L 43/106; H04L 43/067; H04L 43/16
See application file for complete search history.

(56) References Cited

U.S. PATENT DOCUMENTS

| | | | |
|---|---|---|---|
| 9,326,178 B2 | 4/2016 | Jung et al. | |
| 11,783,046 B2* | 10/2023 | Dodson | H04L 63/1425 706/50 |
| 11,960,254 B1* | 4/2024 | Wu | G05B 23/024 |
| 2010/0027432 A1 | 2/2010 | Gopalan et al. | |
| 2015/0278325 A1* | 10/2015 | Masuda | G06F 16/27 707/624 |

(Continued)

FOREIGN PATENT DOCUMENTS

| | | |
|---|---|---|
| WO | 2021/170238 A1 | 9/2021 |
| WO | 2022/010397 A1 | 1/2022 |
| WO | 2022/027559 A1 | 2/2022 |

OTHER PUBLICATIONS

"Unified Engine for large-scale data analytics", Apache Spark™, Retrieved on Oct. 20, 2023, Webpage available at : https://spark.apache.org/.

(Continued)

*Primary Examiner* — Oleg Survillo
(74) *Attorney, Agent, or Firm* — HARNESS, DICKEY & PIERCE, P.L.C.

(57) ABSTRACT

Disclosed are various example embodiments which may be configured to: obtain, for each of one or more network entities, a time series of values of a measurement parameter for respective timestamps, the time series including measured values and a special numerical value at one or more timestamps; parse the time series of values to determine which numerical value in the time series of values corresponds to the special numerical value; assign flags to the values in the time series of values, wherein a flag assigned to a value obtained at a given timestamp indicates whether the measurement was or not available at the given timestamp in the time series of values.

9 Claims, 9 Drawing Sheets

(56) References Cited

U.S. PATENT DOCUMENTS

| | | | |
|---|---|---|---|
| 2019/0102361 A1* | 4/2019 | Muralidharan | G06F 11/302 |
| 2019/0362245 A1* | 11/2019 | Buda | G06F 18/2433 |
| 2020/0125471 A1 | 4/2020 | Garvey et al. | |
| 2020/0211325 A1* | 7/2020 | Kaizerman | G06F 16/2477 |
| 2020/0285619 A1* | 9/2020 | Teyer | G06F 16/2282 |
| 2020/0295861 A1* | 9/2020 | Zinner | H04J 3/14 |
| 2020/0387797 A1* | 12/2020 | Ryan | G06N 3/084 |
| 2021/0041525 A1 | 2/2021 | Hevizi et al. | |
| 2021/0173387 A1* | 6/2021 | Raza | G06Q 10/0637 |
| 2021/0294787 A1* | 9/2021 | Balasubramanian | G06F 17/18 |
| 2022/0248287 A1 | 8/2022 | Chong et al. | |
| 2022/0274261 A1* | 9/2022 | Conus | B25J 9/1653 |
| 2023/0061829 A1* | 3/2023 | Backhus | G06F 17/18 |
| 2024/0019468 A1* | 1/2024 | Dey | G01R 22/061 |
| 2024/0054041 A1* | 2/2024 | Nagar | G06F 11/0787 |

OTHER PUBLICATIONS

MDINI, "Anomaly detection and root cause diagnosis in cellular networks", PhD Thesis, Oct. 2, 2019, 173 pages.

Extended European Search Report received for corresponding European Patent Application No. 22206704.3, dated Mar. 23, 2023, 9 pages.

"3rd Generation Partnership Project; Technical Specification Group Services and System Aspects; Architecture enhancements for 5G System (5GS) to support network data analytics services (Release 17)", 3GPP TS 23.288, V17.6.0, Sep. 2022, pp. 1-208.

European Notice of Allowance dated Jan. 9, 2025 for corresponding European Patent Application No. 22206704.3.

European Intention to Grant For European Patent Application No. 22206704.3, dated Apr. 7, 2025.

\* cited by examiner

DATA ANALYTICS ON MEASUREMENT DATA

TECHNICAL FIELD

Various example embodiments relate generally to a method and apparatus for performing data analytics on measurement data.

BACKGROUND

Data analytics may be performed on time series of measurement data, such as for example multi-variate performance management (PM) data time series. The input of such data analytics is historically collected measurement data that is available for a specific time period and one or more measured network entities (e.g. RAN, Radio Access Network, cells) in a communication network. Measurement data may contain a separate time series of measured values per network entity and/or and per measurement parameter. Alternatively a time series of values may include values of several measurement parameters for one or more network entities.

Despite the network entities, whose measurement data constitute the input of a given data analytics task, are of the same kind, the network entities may have heterogeneous configuration. For example, in a RAN case, if the measurement data covers a large number of RAN cells, then it is likely that some cells will have certain radio features and/or functionalities enabled in their configuration, while others not.

Furthermore, the measurement data per network entity will most likely contain some measurements which are specific to a certain functionality. These make sense for a specific network entity only in periods of time when the given functionality is enabled in the network entity's configuration. For example the CA (Carrier Aggregation) throughput for a radio cell makes sense only when the radio cell is configured for CA.

This type of measurements are referred to herein as "conditional measurements", as the measurement data make sense, i.e. are available at a given timestamp only on the condition that the network entity's configuration at that timestamp supports the measurement such that a measured value is available for the measurement parameter at the given timestamp.

The time periods during which no measured value is available (e.g. because the network entity's configuration is not supporting the measurement for a given measurement parameter), are referred to herein as the "unsupported (measurement) periods" and the measurements performed during these "unsupported periods" are referred herein as the "unsupported measurements".

But the collected measurement data must contain all measured values for all timestamps and one or more network entities, even for unsupported periods during which no measured value is available because the network entity's configuration is not supporting the given conditional measurement. Also the data repository of the network operator are configured to store measured values even during the unsupported periods.

There are several ways of handling this in practice.

The first (explicit) way is to store a specific value (e.g. NULL value) during the unsupported periods: this specific value is not a valid measured value for the measurement parameter and can be distinguished from any other measured value, but this specific value is an explicit indication that the measurement was not supported at the timestamp.

The second (inaccurate) way is to replace the measured value with a specific numerical value that is a valid value for the measurement parameter, but this specific numerical value cannot be distinguished from a "true" measured value obtained outside an unsupported period. This specific numerical value is referred herein to as a "special value" or "special numerical value" for a conditional measurement. Such a special value can be a value which is in the range of valid measured values (e.g. value 0 for the CA throughput), or can be a value that is a valid value for the measurement parameter, but not in the range of valid measured values (e.g. −1 for CA throughput).

In these conditional measurement cases, when the time series of measured values are filled in with a special value at some timestamps, a data analytics functionality most often has no information on the presence of such special value in the numerical measured values. The data analytics functionality therefore cannot differentiate numerically between normal values, and special values filling in for conditional measurements at timestamps when the values of the measurement parameter are not available (due to configuration or any other measurement failure reasons), and it can result in misleading data analytics results. Also this makes root cause analysis (RCA) of the data analytics results harder.

SUMMARY

The scope of protection is set out by the independent claims. The embodiments, examples and features, if any, described in this specification that do not fall under the scope of the protection are to be interpreted as examples useful for understanding the various embodiments or examples that fall under the scope of protection.

According to a first aspect, a method comprises: obtaining, for each of one or more network entities, a time series of values of a measurement parameter for respective timestamps, the time series of values including measured values and a special numerical value at one or more timestamps, wherein the special numerical value is used in the time series at a given timestamp for replacing a value of the measurement parameter when no measured value is available for the measurement parameter at the given timestamp; parsing the time series of values to determine which numerical value in the time series of values corresponds to the special numerical value, wherein the parsing is based on the verification of a first condition and a second condition, wherein the verification of the first condition is based on the detection of same-values sequences having a minimum length in the time series of values, wherein the verification of the second condition is based on a count of value changes occurring in a sliding time window of a given length applied to the time series of values; assigning flags to the values in the time series of values, wherein a flag assigned to a value obtained at a given timestamp indicates whether the measurement was or not available at the given timestamp in the time series of values.

In one or more embodiments, the first condition may be verified if the set of values for which same-values sequences having the minimum length are detected include only one value and the sole value in the set of values is identified as being the special numerical value.

In one or more embodiments, the one or more time series of values may be obtained respectively for the one or more network entities, wherein the parsing may be based on the verification of a third condition, wherein the third condition is verified if the ratio of the number of values in the one or more time series that are equal to the special numerical value found based on the first condition over the number of measured values in the one or more time series is below a threshold.

In one or more embodiments, the second condition may be verified if a count of value changes occurring in a sliding time window is above a threshold for at least one temporal position of the sliding time window.

In one or more embodiments, the method may comprise: performing data analytics on the time series of values based on the assigned flags to generate data analytics results.

In one or more embodiments, the method may comprise: performing an operation on one or more network devices or network function based on the data analytics results.

In one or more embodiments, the method may comprise: determining whether the special numerical value is a value out of a normal range of values in which the measured values fall or in the range of values. The determining may be based on a comparison between a first count of same-values sequences with the special numerical value in time series of values obtained for the one or more network entities and a second count of same-values sequences with the special numerical value in time series of values obtained for one or more network entities that are shorter than a threshold.

In one or more embodiments, when the ratio between the second count and the first count is below a threshold, it is determined that the special numerical value is a value out of the normal range of values and wherein a flag assigned to a value is equal to a first flag value for each value in the time series of values that is equal to the special numerical value and a second flag value otherwise.

In one or more embodiments, when the ratio between the second count and the first count is above the threshold, it is determined that the special numerical value is a value in the normal range of values. The method may comprise: using a statistical distribution of the lengths of same-values sequences of the special numerical value to detect whether the length of a given same-values sequence with the special value is an outlier in the statistical distribution; wherein a flag corresponding to a given timestamp takes a first flag value for each value in the time series of values that is equal to the special numerical value when the length of the same-values sequence including the concerned special numerical value is an outlier in the statistical distribution and a second flag value otherwise.

In one or more embodiments, the statistical distribution may be determined for the lengths of same-values sequences of the special numerical value that are shorter than the minimum length.

In one or more embodiments, analyzing the statistical distribution is performed using a classification algorithm to detect a presence or absence of at least one length that is an outlier in the statistical distribution.

According to a second aspect, an apparatus comprises at least one processor and at least one memory storing instructions that, when executed by the at least one processor, cause the apparatus to perform: obtaining, for each of one or more network entities, a time series of values of a measurement parameter for respective timestamps, the time series of values including measured values and a special numerical value at one or more timestamps, wherein the special numerical value is used in the time series at a given timestamp for replacing a value of the measurement parameter when no measured value is available for the measurement parameter at the given timestamp; parsing the time series of values to determine which numerical value in the time series of values corresponds to the special numerical value, wherein the parsing is based on the verification of a first condition and a second condition, wherein the verification of the first condition is based on the detection of same-values sequences having a minimum length in the time series of values, wherein the verification of the second condition is based on a count of value changes occurring in a sliding time window of a given length applied to the time series of values; assigning flags to the values in the time series of values, wherein a flag assigned to a value obtained at a given timestamp indicates whether the measurement was or not available at the given timestamp in the time series of values.

The instructions, when executed by the at least one processor, may cause the apparatus to perform one or more or all steps of the method according to the first aspect.

According to a third aspect, an apparatus comprises means for performing a method comprising: obtaining, for each of one or more network entities, a time series of values of a measurement parameter for respective timestamps, the time series of values including measured values and a special numerical value at one or more timestamps, wherein the special numerical value is used in the time series at a given timestamp for replacing a value of the measurement parameter when no measured value is available for the measurement parameter at the given timestamp; parsing the time series of values to determine which numerical value in the time series of values corresponds to the special numerical value, wherein the parsing is based on the verification of a first condition and a second condition, wherein the verification of the first condition is based on the detection of same-values sequences having a minimum length in the time series of values, wherein the verification of the second condition is based on a count of value changes occurring in a sliding time window of a given length applied to the time series of values; assigning flags to the values in the time series of values, wherein a flag assigned to a value obtained at a given timestamp indicates whether the measurement was or not available at the given timestamp in the time series of values.

The apparatus may comprise means for performing one or more or all steps of a method according to the first aspect. The means may include circuitry configured to perform one or more or all steps of a method according to the first aspect. The means may include at least one processor and at least one memory storing instructions that, when executed by the at least one processor, cause the apparatus to perform one or more or all steps of the method according to the first aspect.

One or more embodiments concern a computer program comprising instructions for causing an apparatus to perform a method comprising: obtaining, for each of one or more network entities, a time series of values of a measurement parameter for respective timestamps, the time series of values including measured values and a special numerical value at one or more timestamps, wherein the special numerical value is used in the time series at a given timestamp for replacing a value of the measurement parameter when no measured value is available for the measurement parameter at the given timestamp; parsing the time series of values to determine which numerical value in the time series of values corresponds to the special numerical value, wherein the parsing is based on the verification of a first condition and a second condition, wherein the verification of the first condition is based on the detection of same-values sequences having a minimum length in the time series of values, wherein the verification of the second condition is based on a count of value changes occurring in a sliding time window of a given length applied to the time series of values; assigning flags to the values in the time series of values, wherein a flag assigned to a value obtained at a given timestamp indicates whether the measurement was or not available at the given timestamp in the time series of values The instructions may cause an apparatus as disclosed herein to perform one or more or all steps of the method according to the first aspect.

One or more embodiments concern a non-transitory computer-readable medium comprising program instructions stored thereon for causing an apparatus to perform a method comprising: obtaining, for each of one or more network entities, a time series of values of a measurement parameter for respective timestamps, the time series of values including measured values and a special numerical value at one or more timestamps, wherein the special numerical value is used in the time series at a given timestamp for replacing a value of the measurement parameter when no measured value is available for the measurement parameter at the given timestamp; parsing the time series of values to determine which numerical value in the time series of values corresponds to the special numerical value, wherein the parsing is based on the verification of a first condition and a second condition, wherein the verification of the first condition is based on the detection of same-values sequences having a minimum length in the time series of values, wherein the verification of the second condition is based on a count of value changes occurring in a sliding time window of a given length applied to the time series of values; assigning flags to the values in the time series of values, wherein a flag assigned to a value obtained at a given timestamp indicates whether the measurement was or not available at the given timestamp in the time series of values.

The program instructions may cause an apparatus as disclosed herein to perform one or more or all steps of the method according to the first aspect.

BRIEF DESCRIPTION OF THE DRAWINGS

Example embodiments will become more fully understood from the detailed description given herein below and the accompanying drawings, which are given by way of illustration only and thus are not limiting of this disclosure.

It should be noted that these drawings are intended to illustrate various aspects of devices, methods and structures used in example embodiments described herein. The use of similar or identical reference numbers in the various drawings is intended to indicate the presence of a similar or identical element or feature.

DETAILED DESCRIPTION

Detailed example embodiments are disclosed herein. However, specific structural and/or functional details disclosed herein are merely representative for purposes of describing example embodiments and providing a clear understanding of the underlying principles. However these example embodiments may be practiced without these specific details. These example embodiments may be embodied in many alternate forms, with various modifications, and should not be construed as limited to only the embodiments set forth herein. In addition, the figures and descriptions may have been simplified to illustrate elements and/or aspects that are relevant for a clear understanding of the present invention, while eliminating, for purposes of clarity, many other elements that may be well known in the art or not relevant for the understanding of the invention.

One or more example embodiments describe methods for processing time series of measured values obtained for a measurement parameter for respective timestamps and for each of one or more network entities.

The method infers—solely from the numerical values in the time series of measured values—what is the special values used for the unsupported measurements, which measured values correspond to unsupported measurements, at which timestamps they were actually obtained and when the measured values were not available for the different network entities (e.g. due to configuration or potentially other reasons).

The method includes a first phase in which the special value used in the time series of values is detected and a second phase in which flags are assigned respectively to each value in a time series of values. A flag assigned to a measured value obtained at a given timestamp indicates whether the measurement was or not available at the given timestamp in the time series of values. Data analytics may then be performed on the time series of values and using the corresponding flags.

The method is scalable to any measurement data set. The method is designed to be scalable to any number of network entities, any number of measurement parameters and any number of measured values in the measurement time period per network entity.

This method is relevant practical problem for implementing data analytics algorithms and allows anomaly detection (AD) at data analytics stage.

Figure 1:
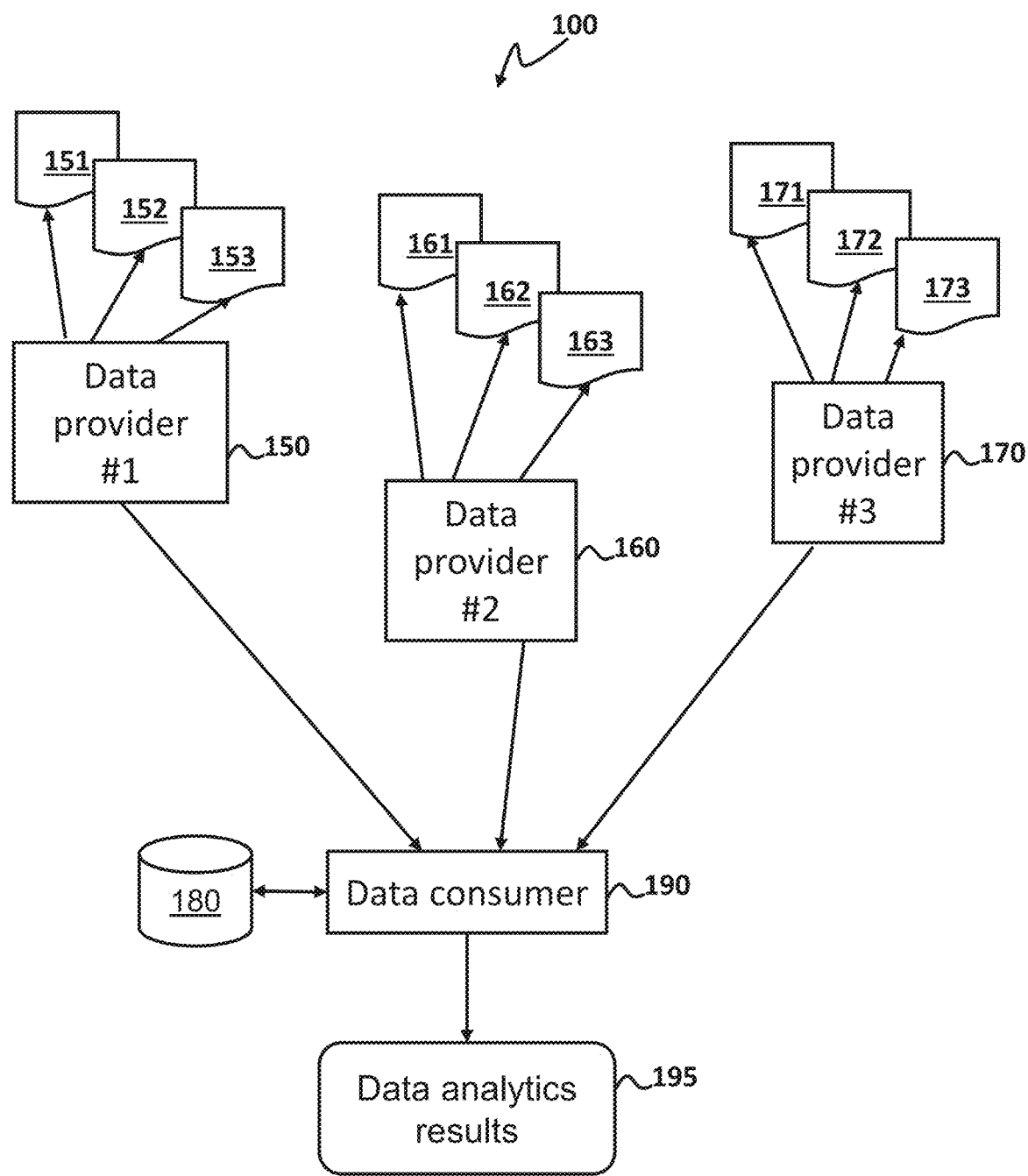
FIG. 1 illustrates an example communication system according to an example.

FIG. 1 illustrates an example communication system 100 in which the method may be implemented. The communication system is configured to perform data collection through one or more communication networks.

Data collection in a communication network may be defined according to a service-oriented approach described as an interaction between a data consumer and a data provider. The data consumer requests data from the data provider when the data consumer needs data to perform a given task or on a subscription basis to receive data when they are available.

For illustrative purpose, the communication system 100 includes several network devices including data providers 150, 160, 170 and a data consumer 190.

A data provider 150, 160, 170 may be any network device or network function that is configured to generate data (e.g. measurement data) and to provide the generated data to at least one data consumer 190.

In the example of FIG. 1, the data provider #1 150 is configured to generate several time series 151, 152, 153 of measured values for a measurement parameter (e.g. a cell throughput) concerning a first measured network object (e.g. a first radio cell). Likewise, the data provider #2 160 is configured to generate several time series 161, 162, 163 of measured values for the same measurement parameter concerning a second measured network object (e.g. a second radio cell). Likewise, the data provider #3 170 is configured to generate several time series 171, 172, 173 of measured values for the same measurement parameter concerning a third measured network object (e.g. a third radio cell).

The data consumer 190 may be any network device or network function that is configured to collect data (e.g. measurement data) from one or more data providers 150, 160, 170. The data consumer 190 may be configured to store the collected data in a database 180. The data consumer 190 may be configured to perform data analytics on the collected data and generate data analytics results 195.

A time series of values for a network entity and a measurement parameter includes values of the measurement parameter may be obtained for respective timestamps (e.g. evenly spaced timestamps corresponding to time steps) inside a measurement time period (e.g. historical time period). There may be one timestamp for each measurement interval inside the measurement time period.

A measurement parameter may be any measurable quantity or counter that can be represented by a numerical value. The method is really agnostic to the type of parameter that is measured. For example, without limitation: a throughput, a channel quality, a bandwidth, a signal over noise ratio, a processing load, a power, a current, a voltage, a phase, an amplitude, a temperature, counters of higher layers of the communication network (e.g. packet loss counters, number of successful/failed UE connection attempts, . . . ). etc. The measurement parameter may be measured directly by an appropriate sensor or a signal detector configured to detect a signal representative of the physical parameter. The measurement parameter may be derived based on detections performed by one or more sensors and/or one or more signal detectors.

The measurement parameter may concern a network entity, also referred to herein as the "measured object" or "measured entity" or "measured network entity". A measured network entity may correspond to various entities: a physical device (e.g. a base station, a user equipment, a router, a gateway, a controller, etc) in a communication network, a communication medium in a communication network (e.g. a radio channel or radio subchannel, a frequency band, etc), a radio cell in a communication network, a functionality in a communication network, etc.

The number of distinct measured objects in the time series of values may be high, for example tens of thousands in a RAN cell case. The measurement interval between two values used in typical cases may range for example from one hour to five minutes, while the total historic time period may range for example from several months to one day or one hour.

Figure 2:
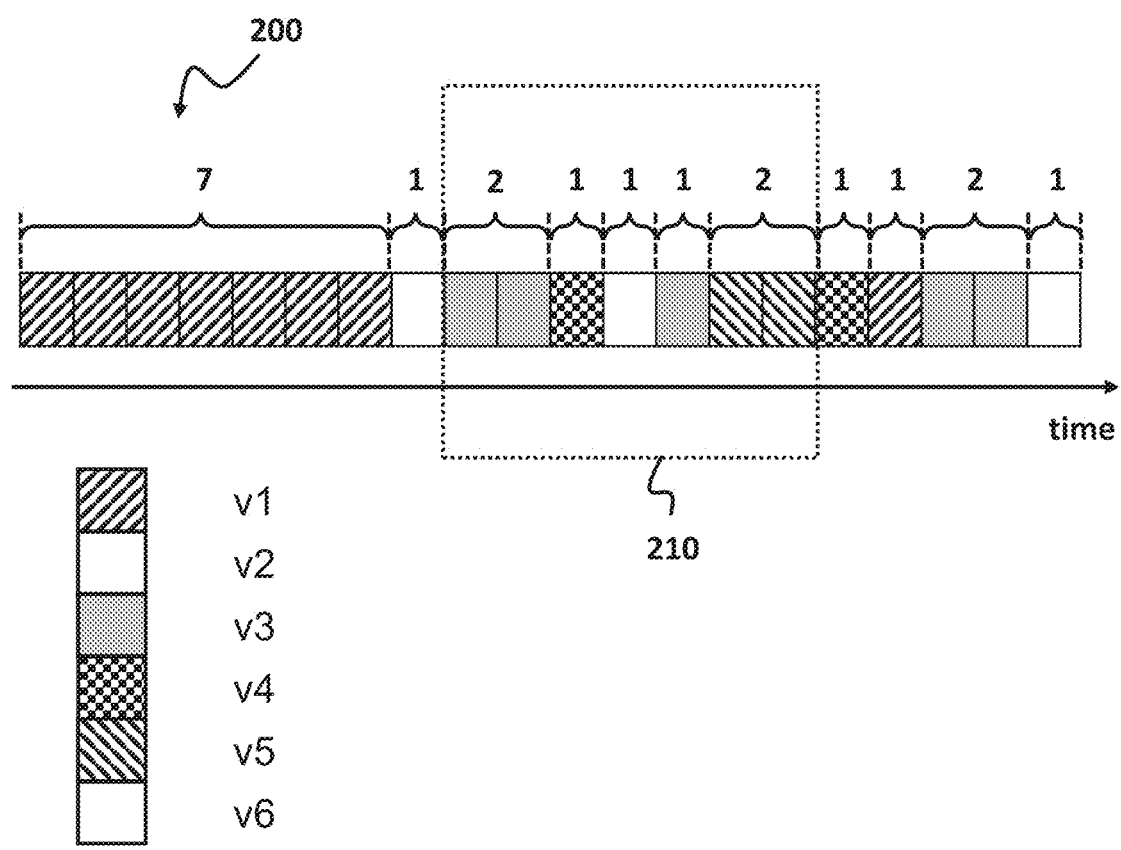
FIG. 2 shows a simplified example of a time series of values according to an example.

FIG. 2 shows a simplified example of a time series 200 of values, where each value is represented by a box. The different measured values are marked with different patterns at the measurement timestamps.

This example times series 200 includes 20 values for corresponding timestamps. Each value may be equal to v1, v2, v3, v4, v5 or v6 as represented by FIG. 2.

As shown in the figure, the time series may include sequences of values at consecutive timestamps (e.g. corresponding to time steps) during which the measured value remains the same. These sequences are referred to herein as same-value sequences. Each same value-sequence has a length in number of timestamps, which can be 1 or larger, and a value, which corresponds to the unchanged measured value during the sequence. In the example of FIG. 2, the value v1 is repeated 7 times and therefore the length of this same-value sequence of value v1 is equal to 7.

A sliding time window 210 may be applied to the time series of values 200 to analyze the values within the sliding time window 210, for example to detect a number of changes of values within the sliding time window 210. In the example of FIG. 2, the sliding time window 210 has a length of 7 (it includes 7 values) and at the position represented in the figure, 4 changes of values occur within the sliding time window 210.

Figure 3:
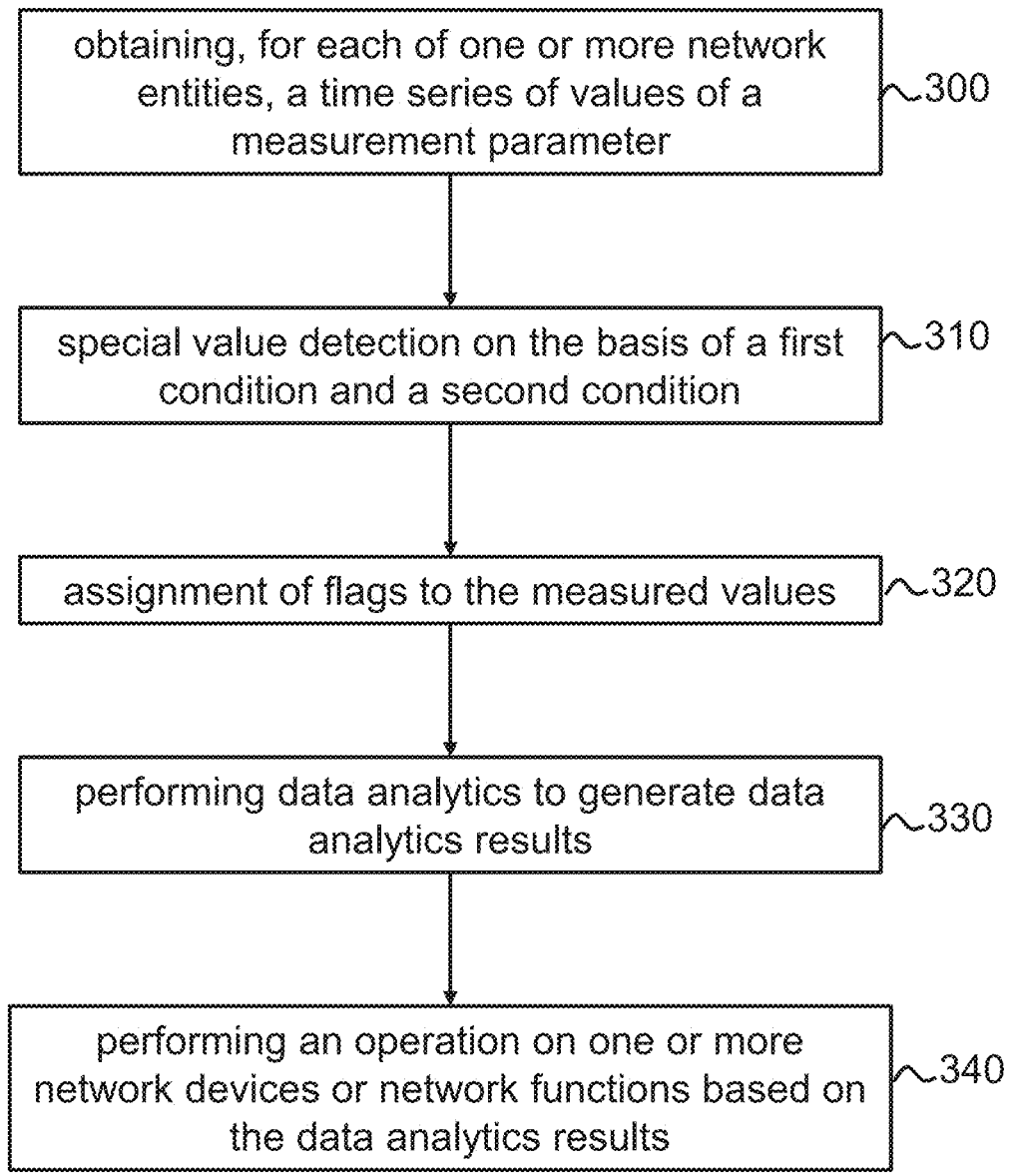
FIG. 3 shows a flowchart of a method for processing measurement data according to an example.

FIG. 3 shows a flowchart of a method for processing time series of measured values according to an example.

The steps of the method may be implemented by an apparatus configured to implement a data consumer according to any example described herein. While the steps are described in a sequential manner, the person skilled in the art will appreciate that some steps may be omitted, combined, performed in different order and/or in parallel.

In step 300, a time series of values of a measurement parameter for respective timestamps is obtained, for each of one or more network entities. Each time series of values may include measured values and a special numerical value at one or more timestamps. As explained herein, the special numerical value is used in the time series at a given timestamp for replacing a value of the measurement parameter when no measured value is available for the measurement parameter at the given timestamp.

In step 310, the time series of values are parsed to determine which numerical value in the time series of values corresponds to the special numerical value.

The parsing may be based on the verification of one or more conditions. The one or more conditions may include at least a first condition #1 and a second condition #2.

The first condition #1 to be verified during the parsing may be based on the detection of same-values sequences having a minimum length L in the time series of values. The first condition #1 may be verified if the set S of values for which same-values sequences having the minimum length L are detected include only one value. In this case, the sole value v0 in the set of values is identified as being the special value v0.

The second condition #2 to be verified during the parsing may be based on a count of value changes occurring in a sliding time window of a given length $W_{ch}$ applied to the time series of values. The second condition #2 may be verified if the count of value changes occurring in a sliding time window is above a threshold $N_{Ch}$ for at least one temporal position of the sliding time window. This means that there exists at least one time window of length $W_{ch}$ in the time series obtained for the network entities, in which the measurement changes value frequently enough, at least $N_{ch}$ times.

A third condition #3 may be verified during the parsing. By using three conditions #1, #2, #3 together, one can make very likely that a given detected measurements are conditional measurements using a special value when a measured value is not available.

The third condition #3 may be based on a ratio q(v0) of the number N(v0) of special values v0 in one or more time series of values obtained respectively for the one or more network entities that are equal to the special value found based on the first condition over the total number N(v) of measured values in these time series. The ration q(v)=N(v0)/N(v) may be compared with a threshold $Q_{th}$, and the third condition is met if the ratio q(v0) is below the threshold $Q_{th}$.

In step 320, based on the result of the parsing step 310, flags are assigned to the values in the time series of values. A flag assigned to a value obtained at a given timestamp indicates whether the measurement was or not available at the given timestamp in the time series of values.

For assignment a flag to a value, the method may comprise: determining whether the special value is a value out of a normal range of values in which the measured values fall or in the normal range of values.

This determination may be is based on a comparison between a first count C0 of same-values sequences with the special value in time series of values obtained for the one or more network entities and a second count CS of same-values sequences with the special value in time series of values obtained for one or more network entities that are shorter than a threshold L.

When the ratio between the second count CS and the first count C0 is below a threshold $P_{th}$, it is determined that the special value is a value out of the normal range of values. In this case, a flag assigned to a measured value is equal to a first flag value if the concerned measured value is equal to the special value and a second flag value otherwise.

When the ratio between the second count CS and the first count C0 is above the threshold $P_{th}$, it is determined that the special value is a value in the normal range of values. In this case, the method may comprise: using a statistical distribution of the lengths of same-values sequences with the special value that are shorter than a threshold to detect that a same-value sequence with the special value has a length that is an outlier in the statistical distribution.

A flag corresponding to a given timestamp takes a first flag value (e.g. the first flag value is 1) for each value in the time series of values that is equal to the special value when the length of the same-values sequence including the concerned value at the given timestamp is an outlier in the statistical distribution and a second flag value (e.g. the second flag value is 0) otherwise.

Using the statistical distribution to detect an outlier may be performed using a classification algorithm to detect that the length value is an outlier in the statistical distribution of length values.

In step 330, data analytics may be performed on the time series of values based on the flags to generate data analytics results.

Data analytics tasks may be categorized into two broad classes based on the length of the analyzed time period. On the one hand, there are offline or batch data analytics tasks, when the data analytics is done for data collected for a long historical time period of one or several months, typically with measurement interval of 1 hour. On the other hand, in online cases the historical time period is one or a few days long, and the measurement interval is usually below 1 hour.

In step 340, one or more operations may be performed on one or more network devices and/or network functions based on the data analytics results. The operation may depend on the context and/or a scenario and/or network environment and/or the type of measurement parameter be monitored. The one or more operations may include at least one of a configuration operation, a resource management operation, a monitoring operation, a channel estimation, an optimization operation, a repair operation, a maintenance operation, a restart, a reboot, a software update, a signaling operation, etc.

Figure 4A:
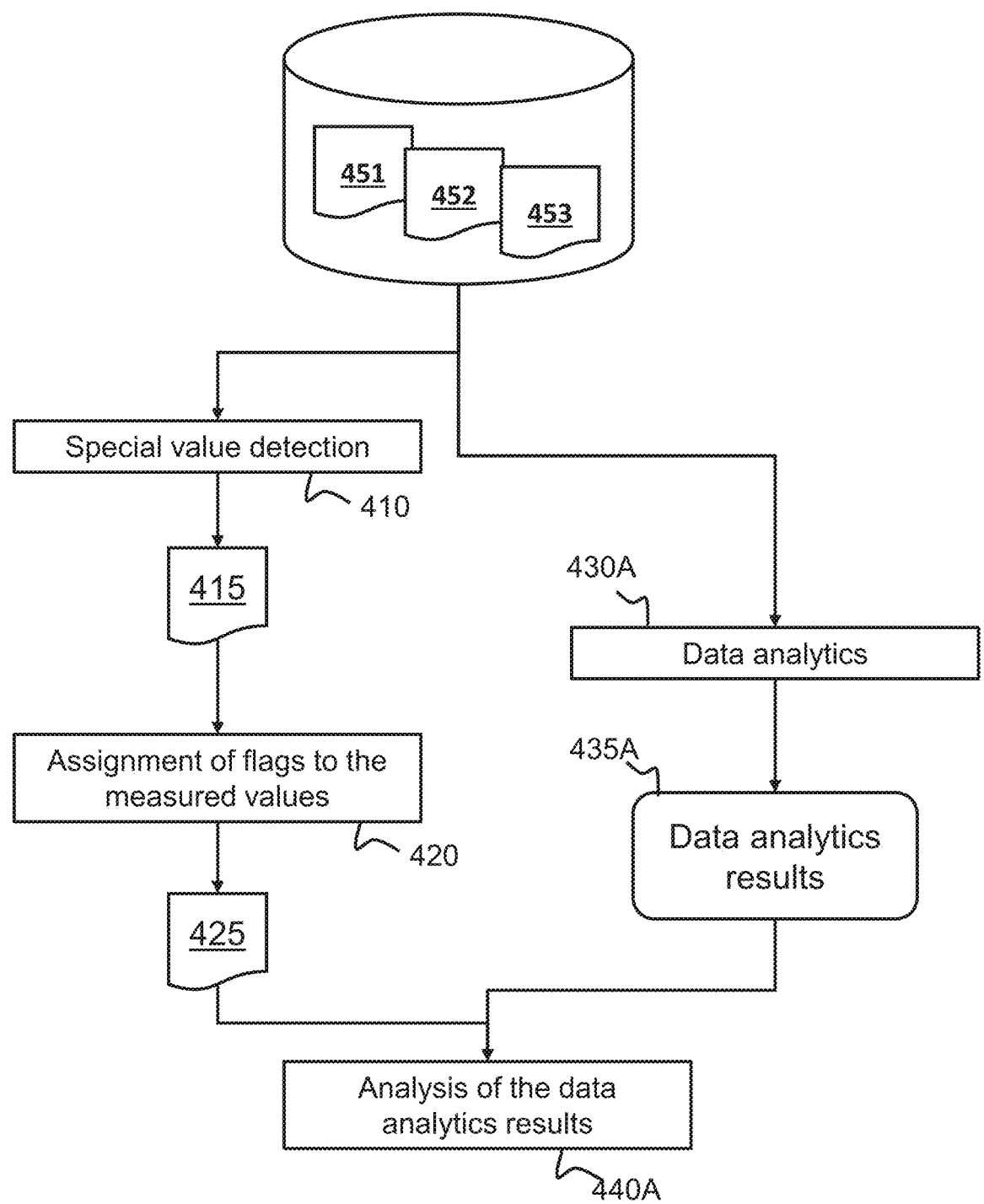
FIG. 4A shows a flowchart of a method for performing data analytics according to an example.

FIG. 4A shows a flowchart of a method for performing data analytics according to an example. The steps of the method may be implemented by an apparatus according to any example described herein. While the steps are described in a sequential manner, the person skilled in the art will appreciate that some steps may be omitted, combined, performed in different order and/or in parallel.

Time series 451, 452, 453 of measured values are stored within a database and provided as input to the method. The time series 451, 452, 453 include measured values per measurement parameter and per each network entity for a given analyzed time period.

In step 410, the time series 451, 452, 453 are parsed to detect special values in the measured values. This parsing may be performed as disclosed for example by reference to FIG. 3 (step 310) and/or FIG. 5. As output of step 410, a table 415 of unsupported measurements may be generated for the measured values that are equal to the detected special value.

The table 415 may include one row per measured value. One row may include the name of the measurement parameter, the associated timestamp of the measured value and the detected special value.

In step 420, flags are assigned respectively to the values in the time series 451, 452, 453 (one flag per value). This assignment may be performed as disclosed for example by reference to FIG. 3 (step 320) and/or FIG. 6. As output of step 420, series of flags 425 corresponding respectively to values in the time series of values are generated (one flag per measured value).

A flag may be a binary value. The flag may be equal to a first flag value (e.g. 1) if the measurement is an unsupported measurement and is equal to a second flag value (e.g. 0) otherwise. A flag is indicative that at the given timestamp no measurement was available (e.g. the functionality required for the measurement was most likely not enabled in the given network entity's configuration).

It is possible that a network entity's configuration has been changed during the analyzed time period, even several times, so the flag value for the same measurement in the per-timestamp profile vectors of a network entity can be 1 in certain sub-periods of the whole historical data time period and 0 in others. When the flag value is set to 1, the measured value for the network entity is not to be interpreted as a real measurement.

In step 430A, data analytics are performed on the time series 451, 452, 453, independently of the knowledge of the presence of special values in these time series. As output of step 430A, data analytics results 435A are generated. In FIG. 4A, the data analytics (step 430A) is executed for the whole time series and the steps 410 and 420 may be executed in parallel with the data analytics (step 430A).

In step 440A, the data analytics results 435A are analyzed together with the series of flags generated in step 420. The analysis may include interpretation and/or Root Cause Analysis (RCA) of the data analytics results 435A by a human expert. The analysis may include any other analysis task performed by a human expert and/or by an analysis software. The human expert may interpret the data analytics results 435A by using the table 415 of unsupported measurements and/or the series of flags 425 assigned to the measured values.

Figure 4B:
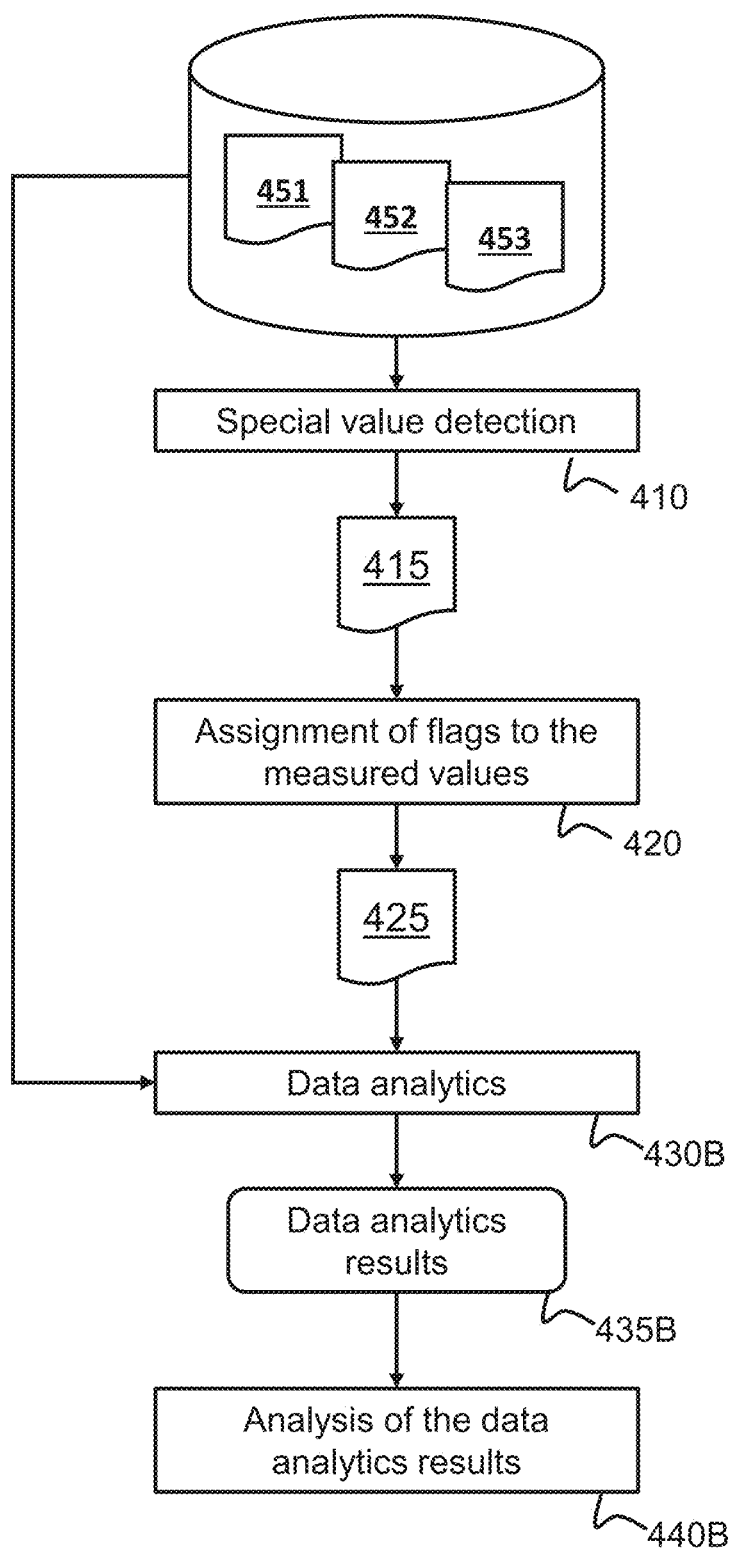
FIG. 4B shows a flowchart of a method for performing data analytics according to an example.

FIG. 4B shows a flowchart of a method for performing data analytics according to an example.

The steps of the method may be implemented by an apparatus according to any example described herein. While the steps are described in a sequential manner, the person skilled in the art will appreciate that some steps may be omitted, combined, performed in different order and/or in parallel.

The method of FIG. 4B is a variant of the method of FIG. 4A and the steps 410, 420 are the same in both methods.

In step 430B, data analytics are performed on the time series 451, 452, 453, based on the series of flags, i.e. with the knowledge of the presence of special values in these time series. As output of step 430B, data analytics results 435B are generated.

During the data analytics, the time series of values may be split into partitions, such that the per network entity per timestamp measured values in a partition have the flag values assigned to them. Then the data analytics is executed independently per each partition.

In step 440B, the data analytics results 435B are analyzed. Like for step 440A, the analysis may include interpretation and/or Root Cause Analysis (RCA) of the data analytics results 435A by a human expert. The analysis may include any other analysis task performed by a human expert and/or by an analysis software. Similarly to FIG. 4A, the human expert may interpret the per-partition analytics result using the table 415 of unsupported measurements and/or the series of flags 425 assigned to the measured values.

The method allows to avoid misinterpretation of data analytics results. For example, if data analytics implements an unsupervised classification that automatically classifies the per timestamp per network entity measured values into a low number of classes. This can be seen as the learned set of possible entity states in which the network entities can be at a given time. In this example, we assume that some of the network entities were configured in certain sub-periods such that a given measurement's prerequisite was not enabled for them, thus the measurements were filled with the special numerical value for these sub-periods. If the unsupervised classification assigns all the measured values equal to the special numerical value to a separate class, this class is thus effectively learned as a separate entity state if the special numerical values are not detected in the measured data as disclosed herein. This entity state can be easily misinterpreted as some kind of performance issue, while it is in fact just a configuration state, or in case of strange special value selection, the PM statistics/symptoms of the entity state can be hard to understand for the expert.

For the concrete example of unsupervised entity state learning, in case of the variant of FIG. 4A, by checking the flags of the measured values classified into a specific entity state and seeing that for all of them a given measurement's value is 1, the human expert interpreting the analytics results can conclude that the entity state corresponds to a configuration state. This way the method really helps the interpretation of the data analytics results. In case of variant of FIG. 4B, it is even more straightforward, as the data analytics results to be interpreted are already for a specific configuration-related profile.

It is of outmost importance to make the interpretation of data analytics results for humans as easy as possible, especially in case of unsupervised analytics like in the above example, because interpretability and explainability of the data analytics results is an essential requirement, for example for adoption and configuration of ML (machine learning) model.

Figure 5:
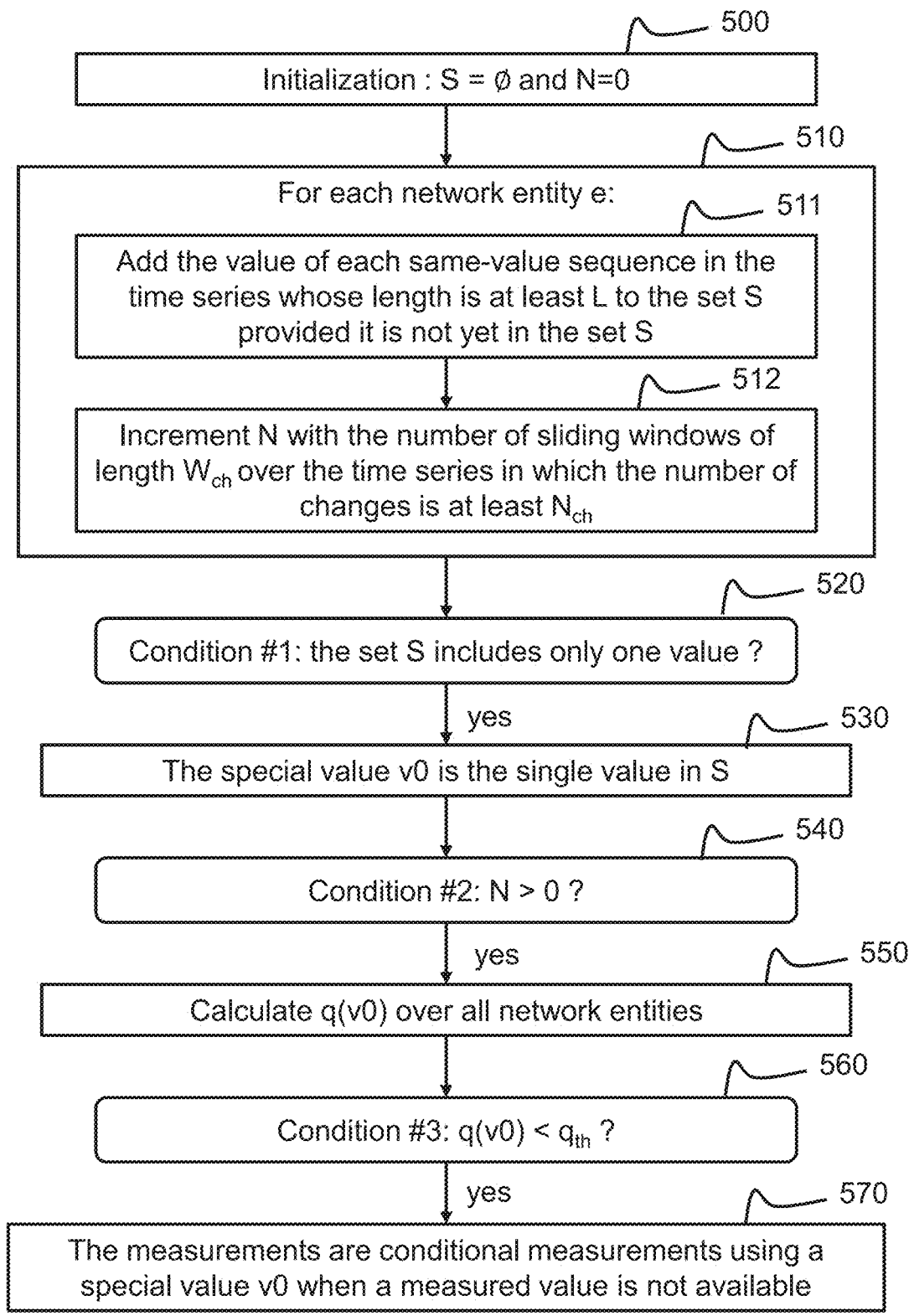
FIG. 5 shows a flowchart of a method for detecting a special numerical value according to an example.

FIG. 5 shows a flowchart of a method for detecting a special numerical value according to an example.

The steps of the method may be implemented by an apparatus according to any example described herein. While the steps are described in a sequential manner, the person skilled in the art will appreciate that some steps may be omitted, combined, performed in different order and/or in parallel.

The method concerning the processing applied for one specific measurement parameter to the time series of measured values obtained for this measurement parameter. The method may be applied for several parameters, by performing the steps independently for each measurement parameter.

In this method several parameters may be used, in which:

L is a lower threshold for the length of long same-value sequences, where L is expressed in number of time steps;

$W_{ch}$ is a length of a sliding window W, expressed in number of time steps;

$N_{th}$ is a lower threshold for the number of value changes in the sliding window W;

$Q_{th}$ is an upper threshold for the relative frequency of the detected special value v0.

In step 500, the variables S and N are initialized.

S is the set of measurement values occurring in same-value sequences of length at least equal to L. S is initialized to the empty set.

N is the number of sliding windows of length $W_{ch}$ in which the number of value changes is at least $N_{ch}$. N is initialized to zero.

Step 510 is performed for each network entity for which time series of measures values are obtained. Step 510 includes steps 511 and 512.

In step 511, the set S is updated by adding to the set S the measured value of each same-value sequence in the time series whose length is at least L provided that this measured value is not yet in the set S.

In step 512, the value of N is updated by incrementing N with the number of sliding windows of length $W_{ch}$ over the time series in which the number of changes is at least $N_{ch}$ for a given network entity.

Step 520 is performed when the steps 511 and 512 have been performed for all network entities for which the time series of measures values are obtained. In step 520, the first condition #1 is tested. The first condition #1 is verified if the set S includes only one value, noted v0. If the first condition #1 is verified, step 530 is executed after step 520. Otherwise the method ends.

If the first condition #1 is verified, this means that there is at least one long same-value sequence of length>=L with the value v0. If there are several long same-value sequences, then all have the same value v0 independently of when and for which network entity they occurred. If the condition #1 is met, then the single value v0 in S is kept as the candidate for special value of the measurement. Otherwise it is determined that the measurements are not conditional measurements and the method terminates.

This condition #1 is based on the natural assumption, that if a given measurement is not available for a network entity due to its configuration, then this configuration state lasts for a longer time period, so the time periods with unchanged special value are most likely long.

The parameter L is configured to define what is long, in number of measurement time steps. L should be high enough such that a normally measured parameter most likely changes value during any period of this length. With such selection of L, we can assume that all same-value sequences with length>=L are most likely those with a special value due to not available measurement. L may for example be equal to the number of measurement timestamps in one day, because of the cyclic behavior of communication networks that follows the daily periodicity of human activities. When a network entity goes over its whole operational cycle during a day, a normal supported measurement is more likely changing values over this period.

However, all the long same-value sequences with length>=L must have the same special value for the measurement, to support the assumption that the measurement collection system fills in always the same special value for when a measurement is not available. This is checked by the requirement that S contains a single value after having processed all network entity's time series.

In step 530, it is determined that the single value v0 in the set S is a candidate special value v0.

In step 540, the second condition #2 is tested. The second condition #2 is verified if N>0. If the second condition #2 is verified, step 550 is executed after step 540. Otherwise the method determines that the special value v0 found at step 530 is not used for unsupported measurements and the method ends.

If the second condition #2 is verified, then there exists a time window of length $W_{ch}$ in the time series of at least one of the network entities, in which the measurement changes value frequently enough, at least $N_{ch}$ times, so that one can assume that in that time window the measurement was available and measured normally for the network entity.

Note, that here the number of value changes are counted, not the number of different values taken during the sliding window. For example there can be many value changes just by switching between two different values.

While condition #1 collects evidence, that one or more network entities have long periods when the measurement is not available (represented with the same special value in their time series), condition #2 collects evidence that there one or more periods for some network entity or network entities when the measurement is available and measured normally as indicated by frequent value changes. Checking this condition #2 is done because unsupported measurement means not only that the measurement is not available for network entities and periods when their configuration lacks the required feature, but also that it is available for other network entities and/or other periods.

The adjustment of the values of $W_{ch}$ and $N_{ch}$ may be performed in different manners. However, if the value of L is selected to span one day like discussed above, then $W_{ch}$ could be equal to L and $N_{ch}$ be selected such that $N_{ch} > W_{ch}/L_{min}$, where the $L_{min}$ is a period length selected such that the configuration of an network entity remains the same during $L_{min}$ with high probability. This selection of $N_{ch}$ prevents the misinterpretation of value changes between special value and normal measured value/values which may happen due to configuration changes as normal changes between normal measured values.

In step 550, q(v0) is computed over all measured entities. q(v0) is the relative frequency of the candidate special value q(v0) over all measurements. q(v0) gives what fraction of all v0 the measurements in the time series of all network entities takes the special value candidate special value v0.

In step 560, the third condition #3 is tested. The third condition #3 is verified if $q(v0) < Q_{th}$. If the third condition #3 is verified, step 570 is executed after step 560. Otherwise the method it is determined that the measurements are not conditional measurements and the method ends.

The third condition #3 may not be used but it improves the method in specific cases because there are often measurement parameters that most of the time take the same value, even when they are available and measured normally. For example counters of very seldom error events, that most of the time take the value of 0. Based on the first two conditions these type of measurements can be very easily mistaken as unsupported measurements with the special value being their usual value (0 for the error counters example) even when they are available and measured normally for all network entities and over the whole measurement period. As a trade-off, to avoid false positives, these situations are detected by using this third condition #3. The value of $Q_{th}$ can be selected to some value slightly lower than 1, for example between 0.9 and 1 or between 0.99 and 1.

In step 570, it is determined that the measurements are conditional measurements using the special value v0 when a measured value is not available.

The method is biased toward increasing the reliability that a measurement detected as an unsupported measurement by the method is indeed an unsupported measurement, at the expense of potentially missing the detection of some measurements that are unsupported measurements in reality.

In general, a conditional measurement can fall into two categories with respect to its special value:
a) the special value is out of the range of normal measured values, or
b) it can be the result of a normal measurement too.

In both cases, the special value is a valid value of the measurement parameter, e.g. a valid floating point or integer value.

In case of a category a) the determination whether the measured value was available at a given timestamp for a given network entity is straightforward: if the measured value is equal to the special value, then the measured value was not available (e.g. the corresponding flag value may be equal to 1), otherwise it was available (e.g. the flag value may be equal to is 0).

For category b) a measured value equal to the special value does not mean necessarily that the measured value was not available at the timestamp. At these timestamps, the flag value can be still both 0 or 1, while at timestamps where it is not equal to the special value the profile vector element is surely 0.

To be able to assign flags to the measured values, it is necessary to infer from the input measured data which of the two categories a time series of measured values belongs to.

Figure 6:
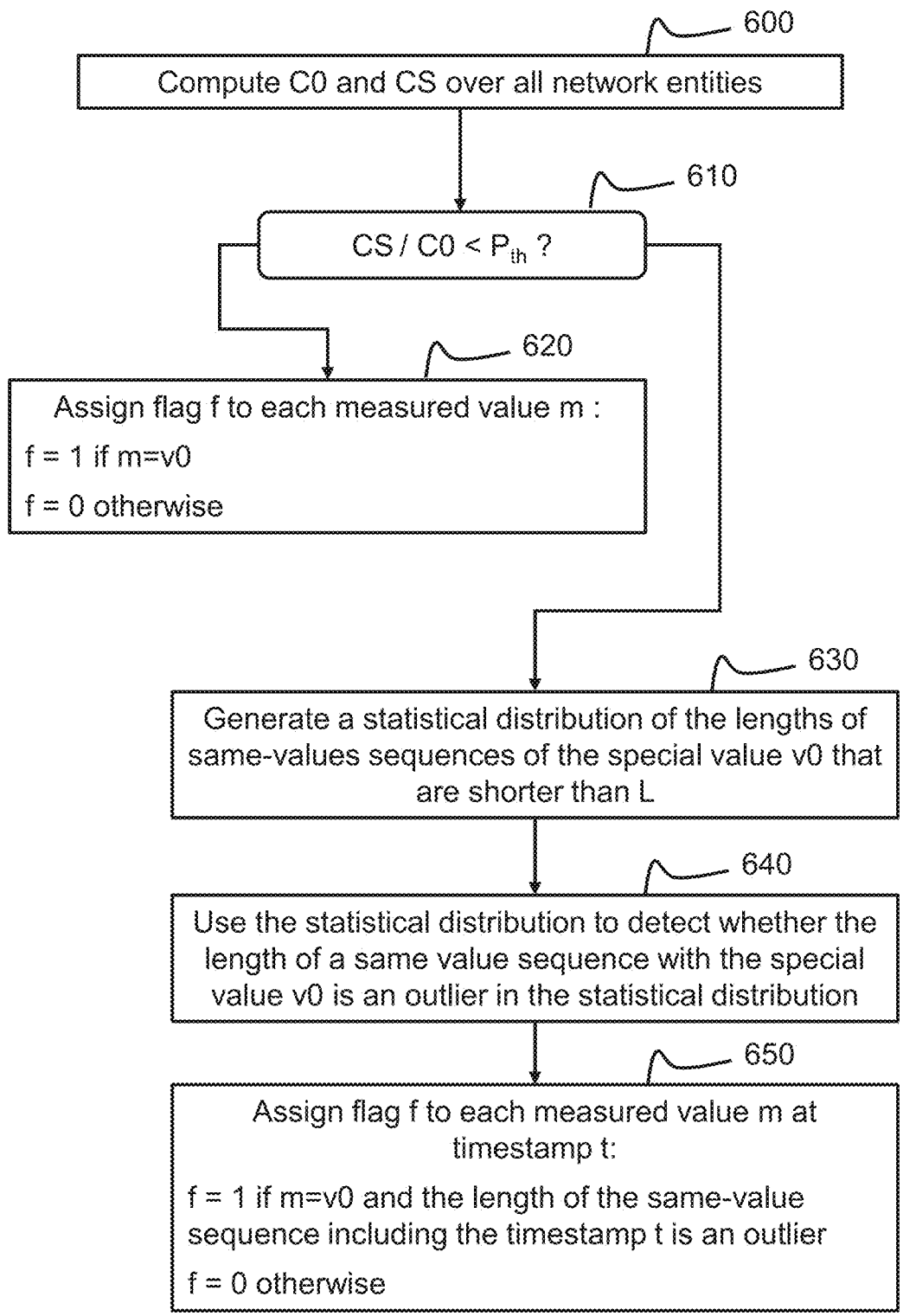
FIG. 6 shows a flowchart of a method for assigning flags to measured values according to an example.

FIG. 6 shows a flowchart of a method for assigning flags to measured values according to an example.

The steps of the method may be implemented by an apparatus according to any example described herein. While the steps are described in a sequential manner, the person skilled in the art will appreciate that some steps may be omitted, combined, performed in different order and/or in parallel.

The same threshold L applied to lengths of same-values sequences is used as for the special value detection step (see FIG. 5 and the corresponding description).

The method evaluates of a heuristic condition (see step 610) for inferring which of the two categories described above the time series of measured values belongs to. The heuristic condition is based on the observation, that in case of unsupported measurement that falls in category a) (for which the special value is not a normal measured value) there are two possible cases when a same-value sequence with the special value is shorter than the L parameter (what has been used for the special value detection step):

case #1: the unsupported measurement period with a configuration state leading to unsupported measurements is at least L, but this unsupported measurement period may just partly fall into the whole measurement time period of the input data: either because the unsupported measurement period has started before the start of the whole measurement period, and only the second part of the measured values is contained in the whole measurement period; or the unsupported measurement period has started before the end of the whole measurement period and only the first part is contained in whole measurement period.

case #2: the unsupported measurement period is contained entirely in the whole measurement period, but its length is shorter than the L parameter. This can happen, because the threshold L cannot be selected perfectly. However with a reasonably good selection one can assume that only a small fraction of unsupported measurement periods are shorter than L.

In step 600, the values of the variables C0 and CS are determined.

C0 is the total count of same-value sequences with the special value v0 over all time series of measured values obtained for all network entities during a time period.

CS counts the same-value sequences with the special value v0 over all time series of measured values obtained for all network entities that are shorter than L and corresponds to an unsupported measurement period that is contained entirely in the whole measurement period. These same-value sequences correspond to unsupported measurement period(s) that is (are) contained entirely in the whole measurement period, but has (have) a length shorter than the L parameter, as defined in case #2 above.

The same-value sequences with the special value v0, if any, that starts right at the first measurement time step may then be excluded for the determination of CS. Likewise, the same-value sequences with the special value v0, if any, that ends right at the last measurement time step may be excluded for the determination of CS.

In step 610, the fraction CS/C0 of the same-value sequences with the special value v0 which are shorter than L over the total count is compared with a threshold $P_{th}$. $P_{th}$ is a relative upper threshold for this fraction of the same-value sequences with the special value v0 which are shorter than L. If CS/C0<$P_{th}$ then step 620 is performed after step 610. If CS/C0>$P_{th}$ step 630 is performed after step 610. In case CS/C0=$P_{th}$ step 620 or 630 may be performed after step 610.

In the approach used in step 610, it is assumed that for an unsupported measurement in category a) and a reasonably good selection of L, the relative fraction CS/C0 is low. Hence, it is determined that if CS/C0<$P_{th}$, then the unsupported measurement belongs to category a), (see step 620) and otherwise the unsupported measurement belongs to category b) (see steps 630-650). $P_{th}$ should be set to a sufficiently small value, for example between 0 and 0.1 or between 0 and 0.01.

In step 620, the flags are assigned to the measured values in the time series obtained for the network entities. Here the assignment of flags per timestamp per network entity is straightforward as described earlier: a first flag value (e.g. f=1) is assigned to a measured value m if m=v0. Otherwise a second flag value (e.g. f=0) is assigned to the measured value m.

In steps 630-650, a statistical approach is used based on the statistical distribution of the lengths of a same-value sequences with the special value.

The length of a same-value sequence with the special value may be used decide whether the same-value sequence is a sequence (referred to as a "not normal" sequence) for which the measurement was not available, or a sequence (referred to as a "normal" sequence) when the special value was the result of normal measurements taking the special value.

In step 630, a statistical distribution of the lengths of same-values sequences of the special value v0 that are shorter than L (the same-values sequences taken into account for the computation of CS) is generated.

As a heuristic, the statistical distribution may be determined on the same-value sequences whose length is shorter than L, assuming that most of these sequences are "normal" sequences.

In step 640, the statistical distribution is used to determine whether the length of a given same-value sequence with the special value v0 is an outlier in the statistical distribution. Here "outlier" means that the length is outstandingly long: the outlier may thus be seen as a high outlier.

The method may be configured to estimate the statistical distribution of the lengths of the "normal" sequences and then detect "not normal" sequences whose length is an outlier according to this statistical distribution.

The detection of the "normal" sequence length statistical distribution and/or the outlier detection may be performed using various algorithms, e.g. a classification algorithm. It can be based on the basic parameters of the statistical distribution (e.g. mean and/or standard deviation) and then using these parameters to detect the outlier values in the statistical distribution, for example by detecting the length values that fall below a threshold computed based on the mean and standard deviation. It can be based on machine learning algorithms. It can be based for example on a classification method like the random forest.

In step 650, the flags are assigned to the measured values in the time series obtained for the network entities. A first flag value (e.g. f=1) is assigned to a measured value m if m=v0 and the length of the same-value sequence including the timestamp t is an outlier in the statistical distribution. Otherwise a second flag value (e.g. f=0) is assigned to the measured value m.

Figure 7:
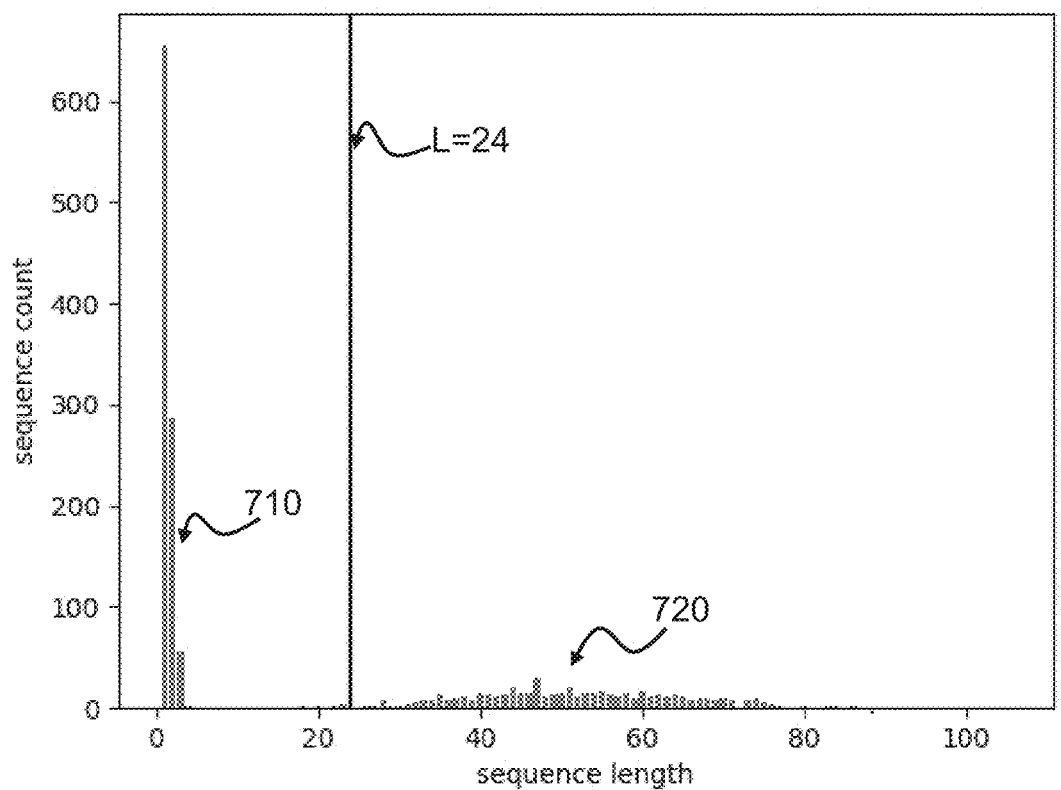
FIG. 7 shows a statistical distribution of lengths of same-value sequences according to an example.

FIG. 7 shows a statistical distribution of the lengths of same-value sequences with the special numerical value v0 according to an example. The x axis is the sequence length in number of measurement timestamps. The y axis is the same-value sequence count.

The statistical distribution shows a first set 720 of "normal" sequence length values between x=25 and x=80. The statistical distribution shows a second set 710 of "outlier" sequence length values between x=1 and x=3. The length values in the set 720 are outliers in the statistical distribution.

A threshold L between the "normal" sequence length values and the "outlier" sequence length values may be set to L=24 or a lower L value (e.g. L>=4). In this example, one can detect the outliers by taking the sequence lengths which are below L=24: this does not introduce much error, because the number of "outlier" sequence length values below L is proportionally very small compared to the total number of sequence length values above L.

It should be appreciated by those skilled in the art that any functions, engines, block diagrams, flow diagrams, state transition diagrams, flowchart and/or data structures described herein represent conceptual views of illustrative circuitry embodying the principles of the invention. Similarly, it will be appreciated that any flow charts, flow diagrams, state transition diagrams, pseudo code, and the like represent various processes.

Although a flow chart may describe operations as a sequential process, many of the operations may be performed in parallel, concurrently or simultaneously. Also some operations may be omitted, combined or performed in different order. A process may be terminated when its operations are completed but may also have additional steps not disclosed in the figure or description. A process may correspond to a method, function, procedure, subroutine, subprogram, etc. When a process corresponds to a function, its termination may correspond to a return of the function to the calling function or the main function.

Each described function, engine, block, step described herein can be implemented in hardware, software, firmware, middleware, microcode, or any suitable combination thereof.

When implemented in software, firmware, middleware or microcode, instructions to perform the necessary tasks may be stored in a computer readable medium that may be or not included in a host apparatus or host system. The instructions may be transmitted over the computer-readable medium and be loaded onto the host apparatus or host system. The instructions are configured to cause the host apparatus or host system to perform one or more functions disclosed herein. For example, as mentioned above, according to one or more examples, at least one memory may include or store instructions, the at least one memory and the instructions may be configured to, with at least one processor, cause the host apparatus or host system to perform the one or more functions. Additionally, the processor, memory and instructions, serve as means for providing or causing performance by the host apparatus or host system of one or more functions disclosed herein.

The host apparatus or host system may be a general-purpose computer and/or computing system, a special purpose computer and/or computing system, a programmable processing apparatus and/or system, a machine, etc. The host apparatus or host system may be or include or be part of: a user equipment, client device, mobile phone, laptop, computer, network element, data server, network resource controller, network apparatus, router, gateway, network node, computer, cloud-based server, web server, application server, proxy server, etc.

Figure 8:
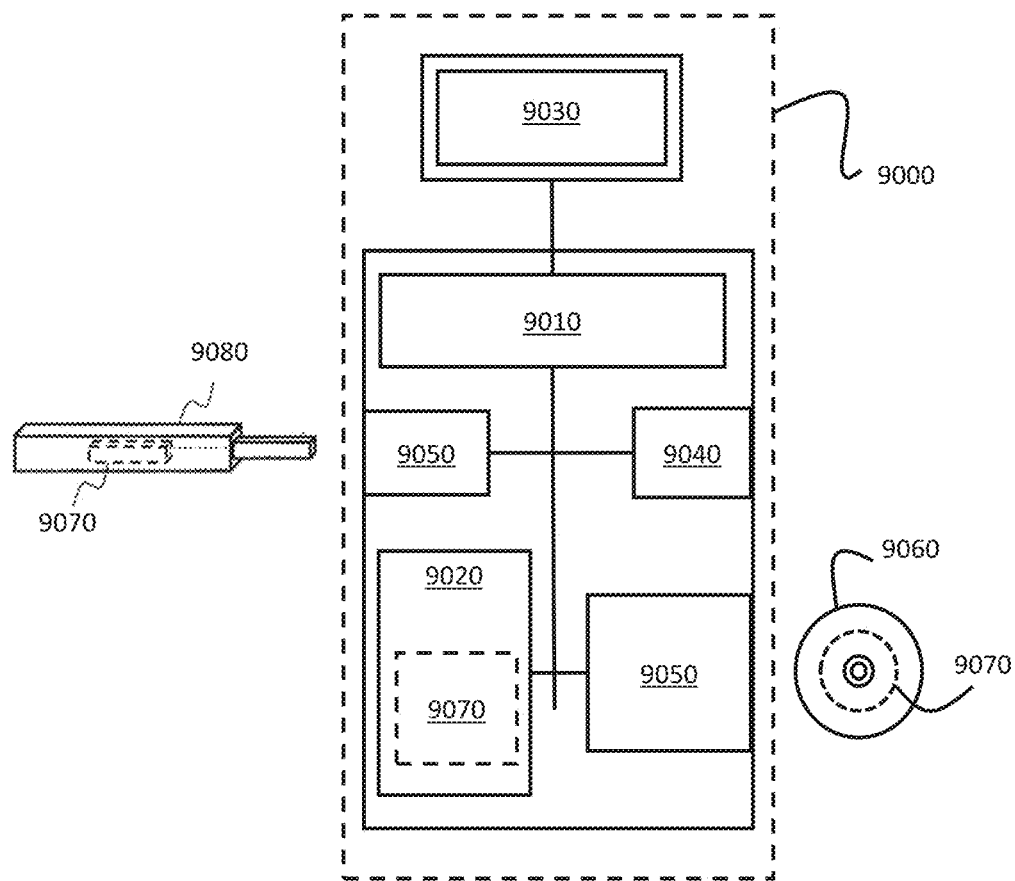
FIG. 8 illustrates an example embodiment of an apparatus 9000 according to an example.

FIG. 8 illustrates an example embodiment of an apparatus 9000. The apparatus may be configured to host at least one data consumer entity as disclosed herein. The apparatus may be configured to perform one or several of the methods disclosed herein.

As represented schematically, the apparatus 9000 may include at least one processor 9010 and at least one memory 9020. The apparatus 9000 may include one or more communication interfaces 9040 (e.g. network interfaces for access to a wired/wireless network, including Ethernet interface, WIFI interface, etc) connected to the processor and configured to communicate via wired/non wired communication link(s). The apparatus 9000 may include user interfaces 9030 (e.g. keyboard, mouse, display screen, etc) connected with the processor. The apparatus 9000 may further include one or more media drives 9050 for reading a computer-readable storage medium (e.g. digital storage disc 9060 (CD-ROM, DVD, Blue Ray, etc), USB key 9080, etc). The processor 9010 is connected to each of the other components 9020, 9030, 9040, 9050 in order to control operation thereof.

The memory 9020 may include a random access memory (RAM), cache memory, non-volatile memory, backup memory (e.g., programmable or flash memories), read-only memory (ROM), a hard disk drive (HDD), a solid state drive (SSD) or any combination thereof. The ROM of the memory 9020 may be configured to store, amongst other things, an operating system of the apparatus 9000 and/or one or more computer program code of one or more software applications. The RAM of the memory 9020 may be used by the processor 9010 for the temporary storage of data.

The processor 9010 may be configured to store, read, load, execute and/or otherwise process instructions 9070 stored in a computer-readable storage medium 9060, 9080 and/or in the memory 9020 such that, when the instructions are executed by the processor, causes the apparatus 9000 to perform one or more or all steps of a method described herein for the concerned apparatus 9000.

The instructions may correspond to program instructions or computer program code. The instructions may include one or more code segments. A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

When provided by a processor, the functions may be provided by a single dedicated processor, by a single shared processor, or by a plurality of individual processors, some of which may be shared. The term "processor" should not be construed to refer exclusively to hardware capable of executing software and may implicitly include one or more processing circuits, whether programmable or not. A processor or likewise a processing circuit may correspond to a digital signal processor (DSP), a network processor, an application specific integrated circuit (ASIC), a field programmable gate array (FPGA), a System-on-Chips (SoC), a Central Processing Unit (CPU), an arithmetic logic unit (ALU), a programmable logic unit (PLU), a processing core, a programmable logic, a microprocessor, a controller, a microcontroller, a microcomputer, a quantum processor, any device capable of responding to and/or executing instructions in a defined manner and/or according to a defined logic. Other hardware, conventional or custom, may also be included. A processor or processing circuit may be configured to execute instructions adapted for causing the host apparatus or host system to perform one or more functions disclosed herein for the host apparatus or host system.

A computer readable medium or computer readable storage medium may be any tangible storage medium suitable for storing instructions readable by a computer or a processor. A computer readable medium may be more generally any storage medium capable of storing and/or containing and/or carrying instructions and/or data. The computer readable medium may be a non-transitory computer readable medium. The term "non-transitory", as used herein, is a limitation of the medium itself (i.e., tangible, not a signal) as opposed to a limitation on data storage persistency (e.g., RAM vs. ROM).

A computer-readable medium may be a portable or fixed storage medium. A computer readable medium may include one or more storage device like a permanent mass storage device, magnetic storage medium, optical storage medium, digital storage disc (CD-ROM, DVD, Blue Ray, etc), USB key or dongle or peripheral, a memory suitable for storing instructions readable by a computer or a processor.

A memory suitable for storing instructions readable by a computer or a processor may be for example: read only memory (ROM), a permanent mass storage device such as a disk drive, a hard disk drive (HDD), a solid state drive (SSD), a memory card, a core memory, a flash memory, or any combination thereof.

In the present description, the wording "means configured to perform one or more functions" or "means for performing one or more functions" may correspond to one or more functional blocks comprising circuitry that is adapted for performing or configured to perform the concerned function(s). The block may perform itself this function or may cooperate and/or communicate with other one or more blocks to perform this function. The "means" may correspond to or be implemented as "one or more modules", "one or more devices", "one or more units", etc. The means may include at least one processor and at least one memory including computer program code, wherein the at least one memory and the computer program code are configured to, with the at least one processor, cause an apparatus or system to perform the concerned function(s).

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, an integrated circuit for a network element or network node or any other computing device or network device.

The term circuitry may cover digital signal processor (DSP) hardware, network processor, application specific integrated circuit (ASIC), field programmable gate array (FPGA), etc. The circuitry may be or include, for example, hardware, programmable logic, a programmable processor that executes software or firmware, and/or any combination thereof (e.g. a processor, control unit/entity, controller) to execute instructions or software and control transmission and receptions of signals, and a memory to store data and/or instructions.

The circuitry may also make decisions or determinations, generate frames, packets or messages for transmission, decode received frames or messages for further processing, and other tasks or functions described herein. The circuitry may control transmission of signals or messages over a radio network, and may control the reception of signals or messages, etc., via one or more communication networks.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

LIST OF MAIN ABBREVIATIONS

AD Anomaly Detection
API Application Programming Interface
CA Carrier Aggregation
ML Machine Learning
PM Performance Management
RAN Radio Access Network
RCA Root Cause Analysis

The invention claimed is:

1. A method, comprising:
obtaining, for each of one or more network entities, a time series of values of a measurement parameter for respective timestamps, the time series of values including measured values and a special numerical value at one or more timestamps, the time series of values including the special numerical value at a given timestamp for replacing a value of the measurement parameter when no measured value is available for the measurement parameter at the given timestamp;
parsing the time series of values to determine which numerical value in the time series of values corresponds to the special numerical value, the parsing including
detecting same-values sequences having a minimum length in the time series of values,
generating a set of at least one value including the value of each of the detected same-values sequences having the minimum length, and if the set of at least one value includes a sole value, identifying the sole value as the special numerical value, and computing a count of value changes occurring in a sliding time window of a given length applied to the time series of values to detect at least one portion of the time series in which a measured value is available for the measurement parameter:

assigning flags to the values in the time series of values based on a result of the parsing, wherein a flag assigned to a value obtained at a given timestamp indicates whether the measurement was or was not available at the given timestamp in the time series of values; and determining whether the special numerical value is a value out of a normal range of values in which the measured values fall or in the range of values, wherein the determining is based on a comparison between a first count of same-values sequences with the special numerical value in time series of values obtained for the one or more network entities and a second count of same-values sequences with the special numerical value in time series of values obtained for one or more network entities that are shorter than a first threshold, wherein the special numerical value is determined to be the value out of the normal range of values in response to a ratio between the second count and the first count being below a second threshold, and wherein a flag assigned to a value is equal to a first flag value for each value in the time series of values that is equal to the special numerical value and a second flag value otherwise, wherein the special numerical value is determined to be the value in the normal range of values in response to the ratio between the second count and the first count being above the second threshold, wherein the method comprises using a statistical distribution of the lengths of same-values sequences of the special numerical value to detect whether the length of a given same-values sequence with the special numerical value is an outlier in the statistical distribution, and wherein a flag corresponding to a given timestamp takes the first flag value for each value in the time series of values that is equal to the special numerical value when the length of the same values sequence including the special numerical value is the outlier in the statistical distribution and the second flag value otherwise.

2. The method according to claim 1, wherein one or more time series of values are obtained respectively for the one or more network entities, and wherein the parsing includes determining if a ratio of a number of values in the one or more time series that are equal to the sole value identified as the special numerical value over a number of measured values in the one or more time series is below a third threshold.

3. The method of claim 1, wherein a portion of the time series in which the measured value is available for the measurement parameter is detected if the count of value changes occurring in the sliding time window is above a third threshold for at least one temporal position of the sliding time window.

4. The method of claim 1, further comprising:
performing data analytics on the time series of values based on the assigned flags to generate data analytics results.

5. The method of claim 4, further comprising:
performing an operation on one or more network devices or a network function based on the data analytics results.

6. The method of claim 1, wherein the statistical distribution is determined for the lengths of same-values sequences of the special numerical value that are shorter than the minimum length.

7. The method of claim 1, wherein analyzing the statistical distribution is performed using a classification algorithm to detect a presence or absence of at least one length that is the outlier in the statistical distribution.

8. An apparatus, comprising:
at least one processor; and
at least one memory storing instructions that, when executed by the at least one processor, cause the apparatus to, obtain, for each of one or more network entities, a time series of values of a measurement parameter for respective timestamps, the time series of values including measured values and a special numerical value at one or more timestamps, the time series of values including the special numerical value at a given timestamp for replacing a value of the measurement parameter when no measured value is available for the measurement parameter at the given timestamp;

parse the time series of values to determine which numerical value in the time series of values corresponds to the special numerical value, the parsing including
detecting same-values sequences having a minimum length in the time series of values,
generating a set of at least one value including the value of each of the detected same-values sequences having the minimum length, and if the set of at least one value include a sole value, identifying the sole value as the special numerical value, and
computing a count of value changes occurring in a sliding time window of a given length applied to the time series of values to detect at least one portion of the time series in which a measured value is available for the measurement parameter:

assign flags to the values in the time series of values based on a result of the parsing, wherein a flag assigned to a value obtained at a given timestamp indicates whether the measurement was or was not available at the given timestamp in the time series of values; and determining whether the special numerical value is a value out of a normal range of values in which the measured values fall or in the range of values, wherein the determining is based on a comparison between a first count of same-values sequences with the special numerical value in time series of values obtained for the one or more network entities and a second count of same-values sequences with the special numerical value in time series of values obtained for one or more network entities that are shorter than a first threshold, wherein the special numerical value is determined to be the value out of the normal range of values in response to a ratio between the second count and the first count being below a second threshold, and wherein a flag assigned to a value is equal to a first flag value for each value in the time series of values that is equal to the special numerical value and a second flag value otherwise, wherein the special numerical value is determined to be the value in the normal range of values in response to the ratio between the second count and the first count being above the second threshold, wherein the method comprises using a statistical distribution of the lengths of same-values sequences of the special numerical value to detect whether the length of a given same-values sequence with the special numerical value is an outlier in the statistical distribution, and wherein a flag corresponding to a given timestamp takes the first flag value for each value in the time series of values that is equal to the special numerical value when the length of the same values sequence including the special numerical value is the outlier in the statistical distribution and the second flag value otherwise.

9. A non-transitory computer-readable medium comprising program instructions stored thereon for causing an apparatus to perform a method comprising:

obtaining, for each of one or more network entities, a time series of values of a measurement parameter for respective timestamps, the time series of values including measured values and a special numerical value at one or more timestamps, the time series of values including the special numerical value at a given timestamp for replacing a value of the measurement parameter when no measured value is available for the measurement parameter at the given timestamp;

parsing the time series of values to determine which numerical value in the time series of values corresponds to the special numerical value, the parsing including detecting same-values sequences having a minimum length in the time series of values, generating a set of at least one value including the value of each of the detected same-values sequences having the minimum length, and if the set of at least one value includes a sole value, identifying the sole value as the special numerical value, and computing a count of value changes occurring in a sliding time window of a given length applied to the time series of values to detect at least one portion of the time series in which a measured value is available for the measurement parameter:

assigning flags to the values in the time series of values based on a result of the parsing, wherein a flag assigned to a value obtained at a given timestamp indicates whether the measurement was or was not available at the given timestamp in the time series of values; and determining whether the special numerical value is a value out of a normal range of values in which the measured values fall or in the range of values, wherein the determining is based on a comparison between a first count of same-values sequences with the special numerical value in time series of values obtained for the one or more network entities and a second count of same-values sequences with the special numerical value in time series of values obtained for one or more network entities that are shorter than a first threshold, wherein the special numerical value is determined to be the value out of the normal range of values in response to a ratio between the second count and the first count being below a second threshold, and wherein a flag assigned to a value is equal to a first flag value for each value in the time series of values that is equal to the special numerical value and a second flag value otherwise, wherein the special numerical value is determined to be the value in the normal range of values in response to the ratio between the second count and the first count being above the second threshold, wherein the method comprises using a statistical distribution of the lengths of same-values sequences of the special numerical value to detect whether the length of a given same-values sequence with the special numerical value is an outlier in the statistical distribution, and wherein a flag corresponding to a given timestamp takes the first flag value for each value in the time series of values that is equal to the special numerical value when the length of the same values sequence including the special numerical value is the outlier in the statistical distribution and the second flag value otherwise.

* * * * *

UNITED STATES PATENT AND TRADEMARK OFFICE
CERTIFICATE OF CORRECTION

PATENT NO. : 12,335,127 B2
APPLICATION NO. : 18/483213
DATED : June 17, 2025
INVENTOR(S) : Lajos Bajzik It is certified that error appears in the above-identified patent and that said Letters Patent is hereby corrected as shown below:

In the Claims

Column 22-23, Lines 9-9, Claim 8 should read as follows:
8. An apparatus, comprising:
    at least one processor; and
    at least one memory storing instructions that, when executed by the at least one processor, cause the apparatus to,
    obtain, for each of one or more network entities, a time series of values of a measurement parameter for respective timestamps, the time series of values including measured values and a special numerical value at one or more timestamps, the time series of values including the special numerical value at a given timestamp for replacing a value of the measurement parameter when no measured value is available for the measurement parameter at the given timestamp;
    parse the time series of values to determine which numerical value in the time series of values corresponds to the special numerical value, the parsing including
        detecting same-values sequences having a minimum length in the time series of values,
        generating a set of at least one value including the value of each of the detected same-values sequences having the minimum length, and if the set of at least one value include a sole value, identifying the sole value as the special numerical value, and
        computing a count of value changes occurring in a sliding time window of a given length applied to the time series of values to detect at least one portion of the time series in which a measured value is available for the measurement parameter;
    assign flags to the values in the time series of values based on a result of the parsing, wherein a flag assigned to a value obtained at a given timestamp indicates whether the measurement was or was not available at the given timestamp in the time series of values; and
    determine whether the special numerical value is a value out of a normal range of values in which the measured values fall or in the range of values,
    wherein the determining is based on a comparison between a first count of same-values sequences with the special numerical value in time series of values obtained for the one or more Signed and Sealed this
Nineteenth Day of August, 2025

Coke Morgan Stewart
*Acting Director of the United States Patent and Trademark Office* network entities and a second count of same-values sequences with the special numerical value in time series of values obtained for one or more network entities that are shorter than a first threshold, wherein the special numerical value is determined to be the value out of the normal range of values in response to a ratio between the second count and the first count being below a second threshold, and wherein a flag assigned to a value is equal to a first flag value for each value in the time series of values that is equal to the special numerical value and a second flag value otherwise, wherein the special numerical value is determined to be the value in the normal range of values in response to the ratio between the second count and the first count being above the second threshold, wherein the apparatus is caused to use a statistical distribution of the lengths of same-values sequences of the special numerical value to detect whether the length of a given same-values sequence with the special numerical value is an outlier in the statistical distribution, and wherein a flag corresponding to a given timestamp takes the first flag value for each value in the time series of values that is equal to the special numerical value when the length of the same-values sequence including the special numerical value is the outlier in the statistical distribution and the second flag value otherwise.